Figure 1:
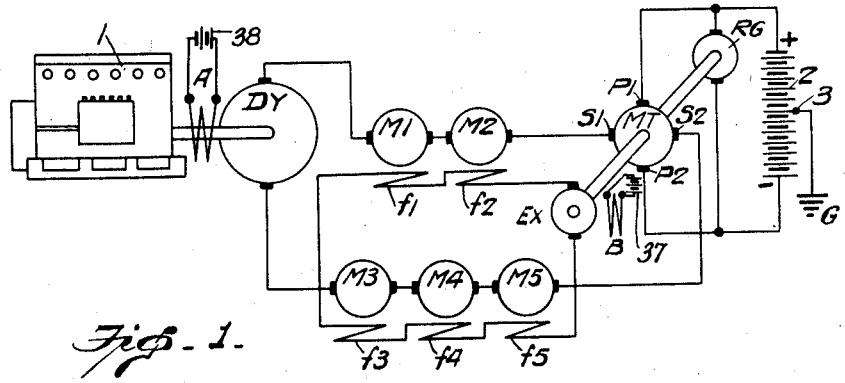

July 28, 1936.   G. M. PESTARINI   2,049,388
ELECTROMECHANICAL POWER PLANT FOR LOCOMOTIVE VEHICLES
Original Filed March 27, 1934   3 Sheets-Sheet 1

Inventor
Giuseppe Massimo Pestarini
By Harris & Bateman
Attorneys

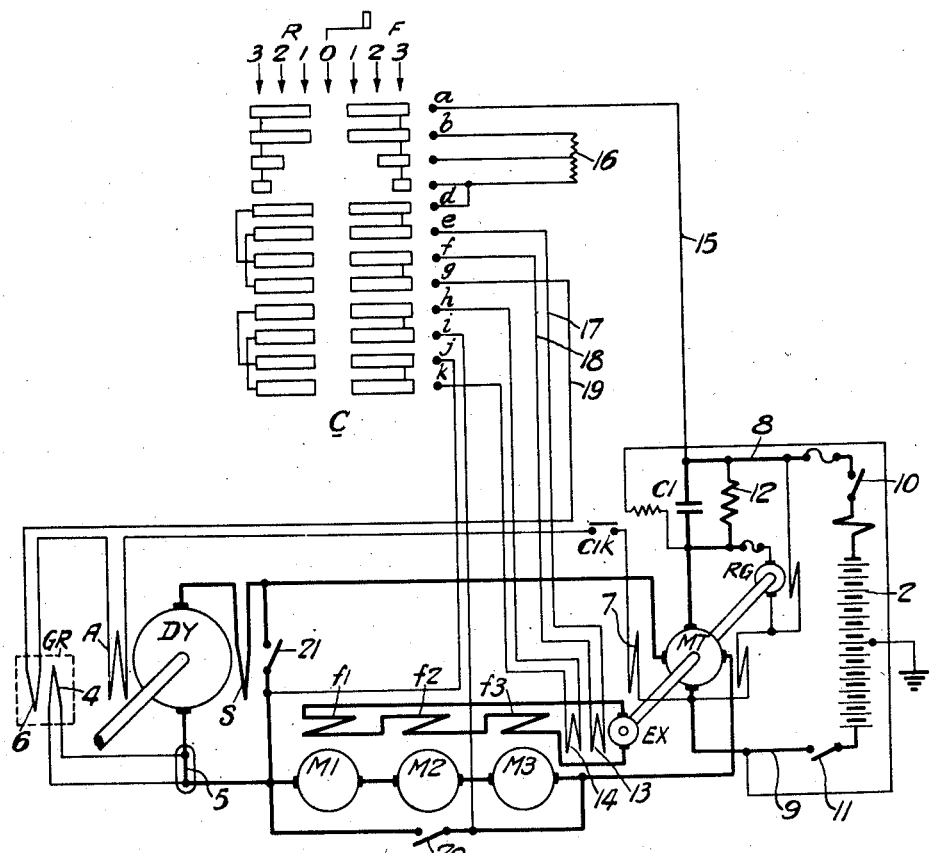
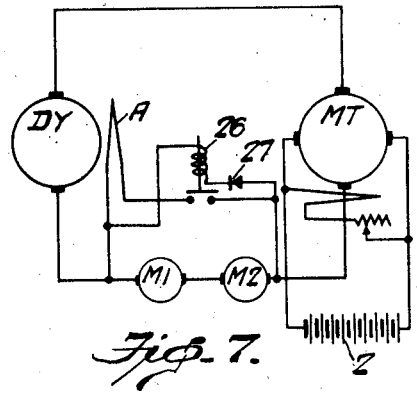
Fig. 7.
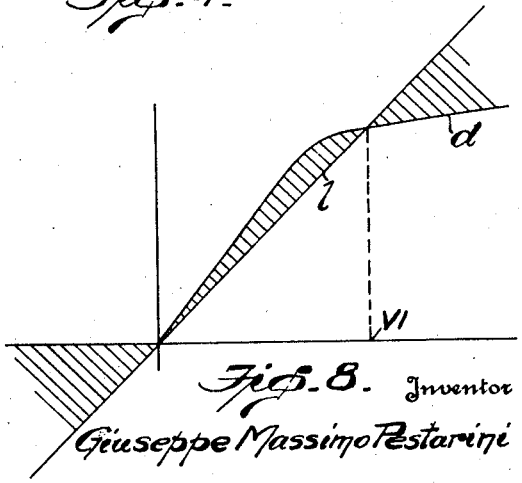
Fig. 8.

July 28, 1936.    G. M. PESTARINI    2,049,388
ELECTROMECHANICAL POWER PLANT FOR LOCOMOTIVE VEHICLES
Original Filed March 27, 1934    3 Sheets-Sheet 3

Inventor
Giuseppe Massimo Pestarini
By Norris & Bateman
Attorneys

Patented July 28, 1936

2,049,388

UNITED STATES PATENT OFFICE 2,049,388

ELECTROMECHANICAL POWER PLANT FOR LOCOMOTIVE VEHICLES

Giuseppe Massimo Pestarini, Sheffield, England

Application March 27, 1934, Serial No. 717,650. Renewed April 10, 1935. In Great Britain March 31, 1933

19 Claims. (Cl. 290—16)

This invention relates to locomotive vehicles of the kind in which the motive power is furnished by an internal combustion engine driving a dynamo electric generator, which supplies current to an electric motor or motors and a battery which may be employed for starting the engine. In order to reduce the size of the engine the battery may be of a capacity greater than that required for starting the engine and be arranged to supply energy to the motor or motors during overloads. The battery may be recharged from the dynamo when the vehicle is at rest, and may be also supplied with current by the motors acting as generators during braking periods. In some cases when only a small amount of energy is required to drive the vehicle the battery may be used to supply energy to the motor or motors for this purpose while the engine is stopped.

According to the present invention, in an equipment of the kind above indicated for fulfilling certain or all of the requirements above mentioned a rotary transformer or motor generator is employed the current in the secondary circuit of which is adapted to be regulated to a substantially constant value, and the primary circuit of which rotary transformer or motor generator is connected with the battery. The dynamo driven by the internal combustion engine and the electric motor or motors are connected in series in the secondary circuit of the rotary transformer or motor generator. The motor or motors may be separately excited from an exciter which may be mounted on or driven by the shaft of the rotary transformer or motor generator.

With the equipment according to the invention if the internal combustion engine, a Diesel engine for example, is running at a constant speed, being regulated by its governor, and the dynamo is excited through a field winding with constant ampere turns, the Diesel engine will supply constant voltage. Consequently as the current in the dynamo armature is constant the power output of the dynamo will in this case also be constant.

The rotary transformer employed is conveniently of the kind called a metadyne transformer.

A metadyne transformer is a rotary apparatus which is designed to transform electric power supplied to it at a fixed voltage and variable amperes into electric power at constant amperes and variable voltage. The apparatus comprises in general a rotor provided with windings connected to a commutator somewhat similar to the armature of a direct current dynamo electric machine, whilst ordinarily four brushes are arranged to make contact with the commutator of which two, usually diametrically opposite each other, are used for the primary circuit and two others, which may be diametrically opposite each other in a different radial plane, are used for the secondary circuit or circuits. The rotor is rotated at constant speed. The primary current flowing in the rotor windings sets up a primary flux which is fixed in direction and may be said to be cut by rotor conductors in which a voltage is thereby induced and a constant secondary current can be drawn from the secondary circuit or circuits at variable voltage. The complete magnetic excitation of the machine is the combined magnetic effect of the primary and secondary currents. In order to obtain a balance of the primary voltages it is necessary that the machine produce an induced primary voltage to oppose the constant voltage supplied to the primary brushes. To accomplish this it is required that the magnetic effect of the secondary circuit, that is, the secondary ampere turns, be maintained constant or, in other words, that the secondary current remain constant. Thus, if an external load is connected in the secondary circuit, it is necessary that the secondary voltage increase sufficiently to supply this additional load and maintain the secondary current constant. A stator may be provided which affords a return path of low magnetic reluctance for the fluxes which are set up by the rotor currents. The stator can be furnished with windings by which various magnetic fluxes can be obtained, which combine with or modify the magnetic fluxes due to the primary and secondary currents circulating in the rotor and thereby regulate the electro-mechanical performance of the machine. Such stator windings may include a winding, known as a "variator" winding, which is arranged to produce a flux co-axial with the flux resulting from the secondary currents flowing in the armature between the secondary brushes, so that by adjustment of the strength of the field due to said variator winding, the secondary current flowing from the metadyne transformer to the consumption or load circuit may be adjusted. A second winding, known as a "regulator" winding, may be provided, acting magnetically upon the currents flowing in the armature, the energization of such regulator winding being operated by the aid of an auxiliary small dynamo, called the regulator dynamo, in such a way as to produce an accelerating torque when the machine runs below a desired speed, and a retarding torque when the machine runs above the desired speed. The elementary metadyne transformer above indicated may be modified and elaborated in many ways under the same general theory of operation.

For a fuller description of metadyne transformers reference is directed to the specification of French Patents No. 647,855, dated February 25, 1922, No. 623,438, dated January 27, 1926, and No. 637,946, dated November 25, 1926. A description of the general construction and operation of metadyne transformers, generators and motors treated mathematically in considerable detail will also be found in a paper entitled "Esquisse sur la Metadyne" by G. M. Pestarini in the Bulletin Scientifique A. I. M. No. 4 April 1931 of L'Association des Ingénieurs Electriciens, published by the Institut Electrotechnique Montefiore, Liége.

When a metadyne transformer is employed the electromotive forces induced in the armature of the dynamo and in the secondary circuit of the metadyne transformer are in series and are opposed by the counter electromotive force of the motors. When the counter electromotive force of the motors is equal to the voltage supplied by the dynamo the secondary voltage of the metadyne transformer will be zero and the battery will therefore supply substantially no current to the primary set of brushes. When more power is required to drive the train, as when it is desired to operate the train at a higher speed, other conditions, such as grade, remaining constant, the motors will require a higher voltage than the electromotive force of the dynamo. That is, when the power required by the motors for propelling the vehicle is greater than that which is supplied by the engine, the metadyne transformer will supply additional regulating electromotive force from its secondary set of brushes, the energy being obtained from the battery through the primary brushes. Under these conditions current will flow from the battery to the primary windings of the metadyne transformer. This sets up a primary flux which will be cut by the armature conductors and induces therein a voltage between the secondary brush set, in such a direction as to produce a rise in voltage between them, as required by the increase in motor load. If the motors, on the other hand, require less electromotive force than that given by the dynamo the secondary electromotive force of the metadyne transformer will be negative and current will be supplied to charge the battery. This will also occur when the motors are regenerating and results in a substantially constant power output from the engine, which normally operates at a constant speed.

In order that the invention may be clearly understood several embodiments thereof will now be described by way of example with reference to the accompanying drawings, in which:—

Figure 1 is an electrical diagram showing the arrangement of the electrical apparatus in one embodiment of the invention.

Figure 2:
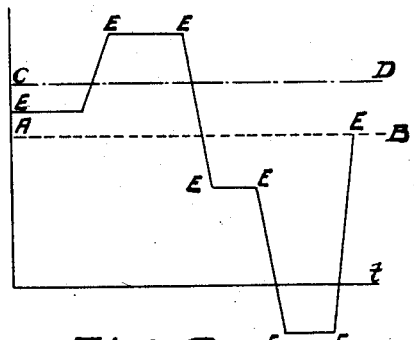
Figure 3:
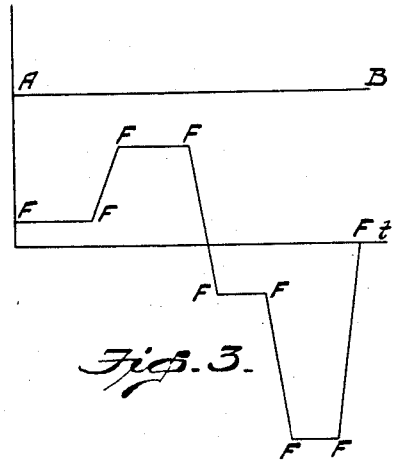
Figure 5:
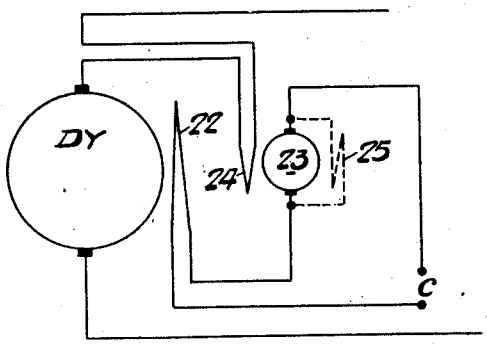
Figure 6:
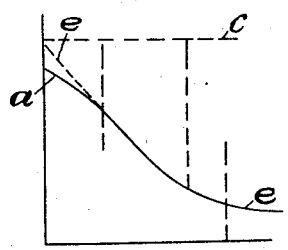
Figure 9:
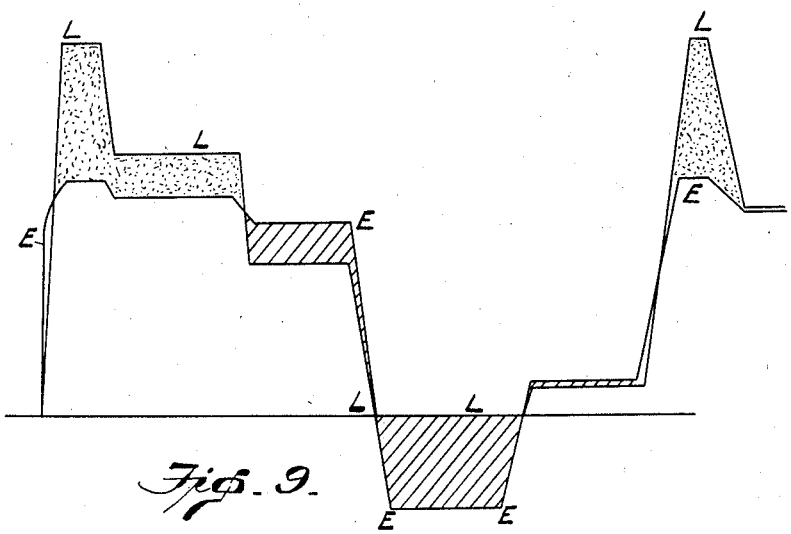
Figure 10:
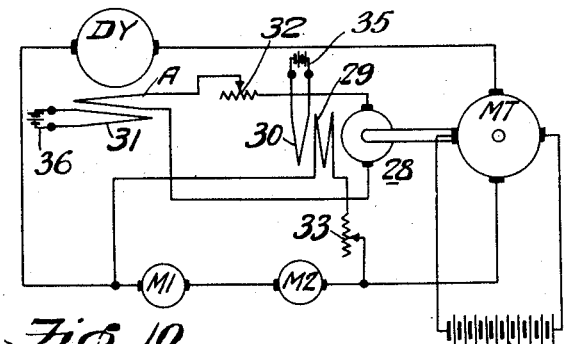

Figs. 2 and 3 are diagrams used for explaining the action of said embodiment of the invention, Fig. 4 is an electrical diagram showing a modified embodiment of the invention, Figs. 5, 7 and 10 show respectively certain modified arrangements of details in systems according to the invention, and Figs. 6, 8, 9 and 11 are diagrams used for explaining the action of said modifications.

Referring first to Fig. 1 of the drawings, the Diesel engine or other internal combustion engine is illustrated generally at 1 being coupled mechanically with the generator DY. A plurality of traction motors are indicated respectively at M1, M2, M3, M4 and M5, whilst the metadyne transformer is indicated at MT. As shown in the figure, the dynamo DY, motors M1 to M5 and the secondary brushes S1 and S2 of the metadyne MT are connected electrically in series with one another as hereinbefore set forth. The storage battery is indicated at 2 and is connected across the primary brushes P1, P2 of the metadyne MT. In Fig. 1 the metadyne machine is illustrated as comprising besides the metadyne transformer itself the usual regulator machine RG and an exciter EX, the three machines being mounted upon a common shaft. Said exciter is connected with the field windings $f1$ to $f5$ of the motors M1 to M5 respectively and is provided with field winding B energized in any desired manner, as by a battery 37. The dynamo DY is illustrated as provided with a field winding A which may be excited at a constant value, as hereinbefore set forth as by a battery 38.

The operation of the above described embodiment of the invention will be clear from the foregoing description.

In the example of the invention illustrated in Fig. 1 the motors M1 and M2 are connected on one side of the metadyne transformer MT whilst the remaining motors M3, M4 and M5 are connected on the other side of said metadyne transformer, whereby the maximum voltage reached in the secondary circuit, namely, the circuit comprising dynamo DY, motors M1 to M5 and the metadyne transformer MT, which circuit is for convenience hereinafter termed the power circuit, will be only a part of the maximum voltage required by said motors. Furthermore the mid-point 3 of the storage battery 2 may be connected to earth as shown at G whereby the voltage between any point of the secondary circuit and earth will be lowered.

Referring now to Fig. 2 which is a graph in which the power required by the motors M1 to M5 is plotted against the time $t$ during an assumed cycle of operation of the locomotive, the line E represents the power required by said motors and shows the variation of this power with time through the cycle. The broken line AB represents the constant power supplied by the internal combustion engine 1 at the optimum speed and the chain line CD represents the maximum output of the engine at its maximum speed.

Fig. 3 which is a diagram similar to Fig. 2 shows how, with the arrangement shown in Fig. 1, and assuming that the electrical circuits have an efficiency of 100 per cent. the energy will be distributed between the Diesel engine DY and the storage battery 2, the line F representing the rate at which the battery is charged or discharged. Under these conditions the dynamo DY will supply a constant power throughout the cycle of operation represented by the straight line AB whilst during the first part of the cycle the storage battery 2 will supply the amount of power required by the motors over and above that at which the engine 1 operates, namely the difference between the ordinates of the line EE and the line AB of Fig. 2. In the latter part of said cycle however the power required by the motors M1 to M5 is less than the regulated output of the engine 1 and the excess of energy produced by the dynamo DY under these conditions is utilized to charge the storage battery 2 as is indicated in Fig. 3 by that part of the line F below the axis of the graph.

With the arrangement illustrated in Fig. 1 the storage battery 2 is arranged to provide for the whole of the peaks of power as determined by the amount by which the output of the engine 1 is above or below the power required by the electric motors. In order to reduce the necessary size of said storage battery the system may be arranged so that only the extreme peaks of power are supplied to or from the battery. In one method of obtaining such operation, the dynamo DY is arranged to be excited proportionally to the voltage required at any moment by the motors M1 to M5 whilst at the same time the Diesel engine is governed so that its power output is responsive to the power taken by said motors.

One such arrangement is illustrated in Fig. 4, in which three motors M1, M2 and M3 are shown connected in series with the metadyne transformer MT and dynamo DY. The relay device for governing the power output of the internal combustion engine (which is not shown in Fig. 4) is indicated diagrammatically at GR and may conveniently be of the watt meter type having one coil 4 connected across a shunt 5 in circuit with the dynamo DY and motors M1, M2 and M3 and with a second coil 6 which is connected in series with the main field winding A of the dynamo DY, a variator winding 7 on the metadyne transformer MT, and with a drum type controller C which is indicated in the conventional manner. The said controller is arranged to connect the above defined series circuit in series with a winding 13 provided on the exciter EX, across the positive and negative conductors 8 and 9 of the storage battery 2 in a manner to be hereinafter described in detail. Switches 10 and 11 are provided as shown for connecting the battery with said conductors 8 and 9 and starting arrangements for the metadyne transformer are illustrated as comprising a series resistance 12 which is arranged to be short-circuited by a contactor C1 which contactor is provided with interlock contacts C1k arranged in the series circuit comprising the variator winding 7 of the metadyne transformer, the winding A of the dynamo DY and the relay winding 6, so that said windings cannot be energized until said contactor C1 is closed. The exciter EX is provided with a second field winding 14 adapted to be connected through the controller C across the motors M1, M2 and M3 and is preferably arranged to be magnetically saturated.

The controller C is arranged in a manner which will be clear to those skilled in the art so as to have an off position O and three positions 1, 2 and 3 (F) for forward running with three further positions 1, 2, and 3 (R) for reverse running. Said controller is arranged so that when moved from the off position to one of its operative positions 1 (F) or 1 (R) a circuit will be completed from the conductor 8, comprising a conductor 15, fixed contacts a and b and corresponding segments of the master controller, the two sections of a resistor 16, the contact fingers d and e or f and corresponding contact segments of the controller according to whether the controller is actuated to a forward or a reverse position, field winding 13 of the exciter EX through conductors 17 and 18, contact fingers f or e and g and corresponding contact segments of the controller, conductor 19, relay winding 6, field winding A of the dynamo DY, interlock contact C1k and variator winding 7 of the metadyne transformer to the conductor 9. As will be seen, the winding 13 will be energized in one direction or the other in accordance with the direction of running to which the controller C is actuated. The amount of the resistor 16 which is inserted in the above described series circuit will depend upon which one of its operative positions 1, 2 or 3 the controller is actuated the arrangement being such that said resistance 16 is cut out as the controller is actuated from the off position 0 to the "full on" position 3 (F) or 3 (R). Actuation of the controller C to an operative position also causes through the contact fingers h, i, j and k and the corresponding contact segments the connection of the field winding 14 of the exciter EX across the motors M1, M2 and M3. The arrangement of the controller is such that the connection of said winding 14 and the connections of the winding 13 are reversed when the controller C is actuated from a forward running to a reverse running position. The generator DY may be provided with a differential winding S.

With this arrangement the relay GR acts upon the governor of the internal combustion engine 1 so that said engine being arranged to run at a variable speed, the power supplied thereby will be approximately proportional to the power required by the propelling motors M1, M2 and M3. The battery 2 will thus intervene only when said motors require more power than is available from the internal combustion engine, the speed of the latter and therefore the voltage supplied by the generator DY having then risen to the value at which said engine develops its maximum power. If the Diesel engine is arranged to run at constant speed whilst developing a variable torque then the relay such as GR is arranged to act upon the excitation of the generator DY to increase the power generated thereby as the load presented by the motors M1, M2, M3 increases in any suitable manner.

With the arrangement illustrated in Fig. 4 the excitation of the generator DY is under the control of the controller C and said quantities are increased as the controller is actuated from the off position 0 to an operative position 3 (F) or 3 (R). The connection of the field winding 14 across the motors M1, M2 and M3 has the result that as the speed of said motors M1, M2 and M3 rises the excitation thereof is reduced, the winding 14 being arranged so as normally to oppose the winding 13. The torque produced by the motors will thus be reduced as the speed thereof rises so that a convenient balancing speed of the locomotive is obtained namely the speed to which the locomotive will be accelerated before the motor torque is balanced by the resistance to traction will be a convenient speed. Obviously the fields of the motors may be reduced in other ways, such as for example by means of a shunt winding on each motor, arranged to oppose a further field winding which produces the main field of said motor, or the first said winding may be fed from an exciter which is excited in accordance with the motor voltage.

As the controller C is actuated through the positions 1, 2, 3 the energization of the variator winding 7 of the metadyne transformer is progressively increased so as to reduce the armature current of the motors M1, M2, M3 and thereby to maintain good commutation of said motors even under the reduced field conditions. The reduction of armature current through the motors will also provide a further reduction of the torque of said motor. Such reduction of the motor armature current does not result in the power output of the generator DY being reduced since the excitation of said generator by the winding A is increased as the excitation of the variator winding 7 is increased. The arrangement of the system shown in Fig. 4 is such that during running of the locomotive in one direction actuation of the controller C to a position corresponding to running in the opposite direction will result in regenerative braking of the locomotive being obtained.

The Diesel engine may be started up by means of operation of the dynamo DY as a motor energized through the metadyne transformer MT from the storage battery 2. During such starting up operation the motors M1, M2 and M3 may be a short-circuited by means of a switch 20. As hereinbefore set forth the locomotive may at certain times be supplied with power entirely from the battery 2 and during these periods the dynamo DY may be short-circuited by means of a switch 21.

Various modifications of the above described embodiments of the invention may be made. For example reduction of the torque produced by the propelling motors as the speed thereof rises, may be obtained in any convenient or desired manner. In casses where such reduction of motor torque is obtained by the reduction of the field strength of the motors as hereinbefore described, means may be provided whereby the armature current is automatically reduced as the motors increase in speed so that the commutation of the motors is not affected by the reduced fields thereof and any convenient arrangement may be adopted for this purpose. For example an arrangement such as set forth in my prior application for Letters Patent Serial No. 677,523 filed June 24, 1933 may be applied to the metadyne transformer. As hereinbefore described, in the arrangement which has been described above with reference to Fig. 4, a reduction of the armature current through the motors M1, M2 and M3 is obtained as the controller is actuated to the "full on" position due to the action of the variator field 7 of the metadyne transformer MT.

It will be appreciated that in arrangements where the motor armature current is reduced as the motor speed rises then if the field of the generator DY is maintained constant the load on said generator will be reduced, assuming that the Diesel or other internal combustion engine operates at a constant speed. It is thus desirable in such arrangements to provide also for an increase in the shunt excitation of the generator DY in inverse proportionality to the armature current of said generator so that the load on the generator DY is maintained approximately constant.

The above requirements may be fulfilled by exciting the generator DY at least in part by the voltage across the load so that the generator voltage is increased in accordance with increase of the voltage across the load. Alternatively the field of the generator DY may be produced by a field winding which is connected with a shunt wound exciter, the critical speed of which is to coincide with the desired speed of operation of the internal combustion engine. With this arrangement the torque of the generator will adjust itself under control of the speed of the engine to the output of the latter as determined by the fuel supply thereto, so that assuming said fuel supply to be constant the power output of the generator also will be constant irrespective of variations in the armature current of the generator DY. As will be appreciated any other known means of controlling the generator field in such a way as to give a voltage approximately or exactly inversely proportional to the armature current of the generator may be adopted. The said generator may be provided with a differential series winding or the arrangement illustrated in Fig. 5 may be employed in which the generator DY is provided with a separately excited winding 22 which is connected in series with the armature 23 of an exciter and with a source of constant voltage electrical energy at C, the exciter 23 being excited by means of a winding 24 inserted in series with the armature DY of the generator. In order to improve the response of the exciter 23, said exciter may be provided with a shunt winding indicated at 25 in broken lines. The operation of this arrangement will be clear from Fig. 6 in which the voltage provided by the constant potential supply source at C is indicated by the line $c$ whilst the voltage produced by the exciter armature 23 with varying current A in the armature DY is indicated by the line $e$ said voltage being subtracted from that of the supply source at C with the result that the generator DY produces a voltage V which varies with the current A in the manner shown by the line $a$.

Referring now to Fig. 7, the embodiment of the invention therein shown is arranged so that the output of the generator is maintained substantially constant and so that the battery 2 supplies only the extreme peaks of power required by the motors M1 and M2 above the average power and in which furthermore the armature current of said motors may be arranged to fall with increase of speed of said motors. With this arrangement the internal combustion engine (not shown) is assumed to operate at a constant speed. The generator DY is so designed as to be saturated for values of field excitation exceeding a given value and so that such saturation is introduced as suddenly as possible after said limit is exceeded so that above this limit the flux remains substantially constant. The generator is excited largely or wholly by the voltage across the load, and as shown in Fig. 7 has a field winding A which is connected across the motors, shown as being two in number, M1 and M2. The arrangement is further such that below the saturation point of the generator the latter produces a voltage which is rather greater than the voltage across the motors M1 and M2 in a predetermined proportion. Thus, until saturation is reached the Diesel engine will supply power somewhat in excess of the load presented by the motors M1, M2, and the battery will be charged at a rate dependent upon said load, as shown in Fig. 8, in which the voltage of the generator DY is plotted as ordinates against the load voltage, that is, the voltage across the motors M1 and M2. The straight line $l$ represents the voltage required by the motors M1 and M2 whilst the line $d$ represents the voltage produced by the generator DY. The difference between these two lines represents the voltage which has to be provided by the storage battery 2 acting through the metadyne transformer MT. Thus, when the line $d$ lies above the line $l$ the battery 2 will be charged, whilst when said line $d$ lies below the line $l$ said battery will supply energy to the motors M1 and M2. Thus when the load voltage reaches the value $V^1$, the output of the generator DY is limited due to the saturation thereof as above referred to, and above this value energy is discharged from the storage battery to the motors.

The distribution of power with the arrangement shown in Fig. 7 is illustrated by the diagram shown in Fig. 9 which is of a similar nature to the diagram in Figs. 2 and 3 but for a different cycle of operation of the load. In Fig. 9 the load required by the motors M1 and M2 is indicated by the line L—L and the power developed by the Diesel engine is represented by the line E—E. The power provided by the storage battery 2 is the difference between said two powers and the resultant energy discharging the battery is indicated in Fig. 9 by the dotted areas whilst the cross hatched areas indicate the energy charging the battery.

The variation of the armature current of the motors M1 and M2 and of the motor field strength may be obtained in any desired manner and the arrangement shown in Fig. 7 will still ensure that when the voltage across the motors M1 and M2 is below a predetermined value the Diesel engine will supply a certain excess of power to charge the battery 2, whilst when the voltage across the motors is greater than said predetermined value the battery 2 will supply substantially the whole of the additional power required by the motors M1 and M2 above that produced by the generator DY.

In Fig. 7 a relay 26 is illustrated the coil of which is connected across the load M1, M2 through a rectifier 27 and the contacts of which are arranged to break the circuit of the field winding A when said coil 26 is energized whereby the field of the dynamo DY is removed when the motors M1 and M2 operate regeneratively, the voltage across said motors being of course reversed under such regenerative operation. Obviously any other convenient or desired polarized switch device may be employed in place of the relay 26 and rectifier 27.

Figure 11:
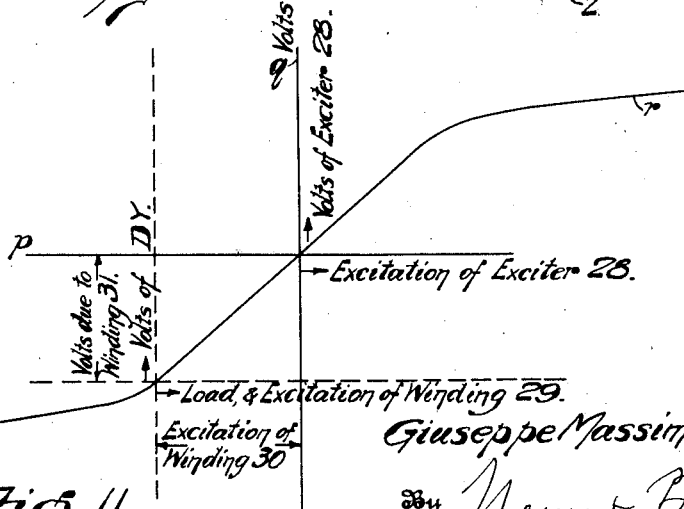

In certain cases it may be desirable that the Diesel engine should supply the whole of the power between certain upper and lower limits, whilst the storage battery 2 supplies or absorbs the excess of energy outside said limits. One arrangement in accordance with the invention for obtaining such operation is illustrated in Fig. 10. In this arrangement the generator DY is provided with an exciter 28 the armature of which is connected across a field winding A of said generator DY. The exciter 28 is itself excited by means of a field winding 29 connected across the motors M1 and M2 and by means of a separately excited field winding 30. The generator DY is also provided with a separately excited field winding 31. The field windings 29 and 30 are arranged to oppose one another. The operation of this arrangement will thus be such that when the voltage across the motors M1 and M2 reaches a predetermined value the field winding 29 will predominate over the field winding 30 to such an extent that the exciter 28 becomes saturated, whilst when the said voltage is below another predetermined value less than the first said predetermined value the winding 30 will predominate over the winding 29 to such an extent that the voltage produced by the exciter 28 will be in the reverse direction and the exciter will again be saturated. The voltage produced by the exciter is applied to the field winding A and thus added or subtracted from the excitation produced by the field winding 31 of the generator DY. The above described operation of the excitation arrangements will be clear from reference to Fig. 11 in which the load voltage and excitation of the winding 29 is plotted on the abscissae, and the voltage of the generator DY is plotted on the ordinates. The excitation produced on the generator DY by the winding 31 is constant and is indicated in Fig. 11 by the horizontal line $p$ whilst the excitation produced on the exciter 28 by the winding 30 is indicated by the vertical line $q$. The voltage produced at the brushes of the generator DY as the load varies will thus be represented by the line $r$ of Fig. 11 and by adjustment of the field strength of the winding 30 the load at which the engine supplies zero power may be adjusted, whilst resistance 32 and 33 enable the upper and lower limits of the demands on the engine to be adjusted.

In order to reduce the wear and tear on the engine and to improve the efficiency of the system the speed of said engine may be varied according to the power required therefrom and, for instance, in the above described arrangement in which a critically excited shunt machine feeding a field winding on the generator driven by the engine is employed, any desired reduction of speed may be obtained by variation of the resistance in the field of the critically excited regulator exciter.

It is to be understood that many modifications may be made without departing from the scope of the invention, for example in addition to the arrangements above described the power developed by the Diesel or other internal combustion engine may be adjusted independently by variation of the fuel supply and such operation may be obtained for example by electrical control of the fuel supply means in any suitable manner.

I claim as my invention:—

1. A power system including an engine and a generator driven thereby, an electrical load connected to said generator, and means including a metadyne transformer connected in series with said electrical load and said generator for maintaining substantially constant load on said engine.

2. A power system including an engine and a generator driven thereby, an electrical load connected to said generator, a metadyne transformer having a primary brush set and a secondary brush set electrically displaced from said primary brush set, and means connecting said generator and said electrical load in series across said secondary brush set for maintaining substantially constant load on said engine.

3. A power system including an engine and a generator driven thereby, an electrical load connected to said generator, a metadyne transformer having a primary brush set and a secondary brush set electrically displaced from said primary brush set, an electrical source of constant potential power supply, means for connecting said primary brush set across said electrical source of power supply, and means connecting said generator and said electrical load in series across said secondary brush set for maintaining substantially constant load on said engine.

4. A power system including a constant speed prime mover and a generator driven thereby, means including a field exciting winding for supplying a constant excitation for said generator, an electrical load connected to said generator, and means including a metadyne transformer connected in a series circuit with said electrical load and said generator for maintaining constant current in said series circuit.

5. A power system including an engine and a generator driven thereby, an electrical load connected to said generator, a metadyne transformer having a primary brush set and a secondary brush set electrically displaced from said primary brush set, an electrical source of substantially constant potential power supply, means for connecting said primary brush set across said electrical source of power supply, means connecting said generator and said electrical load in series across said secondary brush set for maintaining substantially constant load on said engine, and means for causing said metadyne to operate at constant speed.

6. A power system including an engine and a generator driven thereby, a motor connected to said generator, a field exciting winding for said motor, means responsive to an electrical characteristic of said motor for varying the excitation of said motor field exciting winding, and means including a metadyne transformer connected in series with said motor and said generator for maintaining substantially constant load on said engine.

7. A power system including an engine and a generator driven thereby, a motor connected to said generator, a field exciting winding for said motor, means responsive to an electrical characteristic of said motor for varying the excitation of said motor field exciting winding in inverse relation to the speed of said motor, and means including a metadyne transformer connected in series with said motor and said generator for maintaining substantially constant load on said engine.

8. A power system including an engine and a generator driven thereby, a motor connected to said generator, a metadyne transformer having a primary brush set and a secondary brush set electrically displaced from said primary brush set, an electrical source of substantially constant potential power supply, means for connecting said primary brush set across said electrical source of power supply, means connecting said generator and motor in series across said secondary brush set for maintaining substantially constant load on said engine, and means responsive to the speed of said motor for varying the voltage of said generator.

9. A power system including an engine and a generator driven thereby, an electrical load connected to said generator, a metadyne transformer having a primary brush set and a secondary brush set electrically displaced from said primary brush set, an electrical source of power supply, means for connecting said primary brush set across said electrical source of power supply, means connecting said generator and said electrical load in series across said secondary brush set for maintaining substantially constant load on said engine, and means responsive to the voltage across said electrical load and including a field exciting winding on said generator for varying the voltage of said generator.

10. A power system including an engine and a generator driven thereby, a motor connected to said generator, a metadyne transformer having a primary brush set and a secondary brush set electrically displaced from said primary brush set, an electrical source of constant potential power supply, means for connecting said primary brush set across said electrical source of power supply, means connecting said generator and motor in series across said secondary brush set for maintaining substantially constant load on said engine, and means responsive to an electrical characteristic of said motor and including a field exciting winding on said generator for varying the voltage of said generator.

11. A power system including a constant speed prime mover and a generator driven thereby, means including a field exciting winding for supplying a constant excitation for said generator, an electrical load connected to said generator, a metadyne transformer having a primary brush set and a secondary brush set electrically displaced from said primary brush set, an electrical source of constant potential power supply, means for connecting said primary brush set across said electrical source of power supply, means connecting said generator and said electrical load in series across said secondary brush set for maintaining substantially constant load on said engine, and means for varying the voltage of said generator inversely with respect to the current in said series circuit.

12. A power system including an engine and a generator driven thereby, an electrical load connected to said generator, a metadyne transformer having a primary brush set and a secondary brush set electrically displaced from said primary brush set, an electrical source of constant potential power supply, means for connecting said primary brush set across said electrical source of power supply, means connecting said generator and said electrical load in series across said secondary brush set for maintaining substantially constant load on said engine, and means for varying the voltage of said generator in accordance with the voltage across said electrical load for a portion of the range of variation and for varying the voltage of said generator at a different rate beyond said portion of said range of variation.

13. A power system including an engine and a generator driven thereby, a motor connected to said generator, a metadyne transformer having a primary brush set and a secondary brush set electrically displaced from said primary brush set, an electrical source of power supply, means for connecting said primary brush set across said electrical source of power supply, means connecting said generator and motor in series across said secondary brush set for maintaining substantially constant load on said engine, and means responsive to the control of an electrical characteristic of the circuit including said generator, motor, and transformer for varying the speed of the engine.

14. A power system including an engine and a generator having an armature driven thereby, an electrical load, means for connecting said generator armature and said electrical load in series circuit relation, and means including a dynamo-electric machine connected in series with said generator armature and said electrical load for producing a regulating electromotive force in said series circuit and for inherently maintaining substantially constant load on said engine, said dynamo-electric machine being mechanically independent of said generator.

15. A power system including a constant speed prime mover and a generator driven thereby, means including a field exciting winding for supplying a constant excitation to said generator, an electrical load connected to said generator, a source of electrical power supply, and means including a dynamo-electric machine connected in series with said generator and said electrical load and adapted to transfer electrical power between said generator and said source of electrical power supply for maintaining substantially constant current in said series circuit and for maintaining substantially constant load on said engine, said dynamo-electric machine being arranged to produce a regulating electrical potential in said series circuit and being mechanically independent of said generator.

16. A power system including an engine and a generator driven thereby, an electrical load, means for connecting said generator and said electrical load in series circuit relation, a source of electrical power supply, and means including a dynamo-electric machine connected in series with said generator and said electrical load and adapted to transfer electrical power between said generator and said source of electrical power supply for maintaining substantially constant load on said engine, said dynamo-electric machine being arranged to produce a regulating electrical potential in said series circuit and being mechanically independent of said generator.

17. A power system including an engine and a generator driven thereby, an electrical load, means for connecting said generator and said electrical load in series circuit relation, a source of electrical power supply, a dynamo-electric machine, means for connecting said dynamo-electric machine in series with said generator and said electrical load and to said source of electrical power supply, and means including said dynamo-electric machine and adapted to transfer electrical power between said generator and said source of electrical power supply for maintaining substantially constant load on said engine, said dynamo-electric machine being arranged to produce a regulating electrical potential in said series circuit and being mechanically independent of said generator.

18. A power system including an engine and a generator driven thereby, a field exciting winding for said generator, means including an exciter for energizing said generator field exciting winding, means for varying the energization of said field exciting winding in response to speed variations of said generator, an electrical load, a metadyne transformer having a primary brush set and a secondary brush set electrically displaced from said primary brush set, a source of electrical power supply, means for connecting said primary brush set to said source of electrical power supply, means for connecting said generator and said electrical load in series across said secondary brush set, and means dependent upon an electrical charcteristic of said series circuit for maintaining a substantially constant load on said engine.

19. A power system including an engine, a generator driven by said engine, an electrical load connected to said generator, a field exciting winding for said generator, means including an exciter for energizing said generator field exciting winding, means including a field exciting winding for providing a constant component of excitation to said exciter, means dependent upon the voltage across said electrical load and including a second field exciting winding for supplying a component of excitation to said exciter in opposition to said first mentioned exciter field exciting winding, means for varying the excitation of said exciter between predetermined limits in accordance with the voltage across said electrical load, a metadyne transformer having a primary brush set and a secondary brush set electrically displaced from said primary brush set, a source of electrical power supply, means for connecting said primary brush set to said source of electrical power supply, and means for connecting said generator and said electrical load in series across said secondary brush set for maintaining a substantially constant load on said engine.

GIUSEPPE MASSIMO PESTARINI.